United States Patent [19]

Henkel

[11] Patent Number: 4,762,225

[45] Date of Patent: Aug. 9, 1988

[54] COMPACT DISC GUARD AND CARRYING SYSTEM

[76] Inventor: Walter R. Henkel, 711 John St., Secaucus, N.J. 07094

[21] Appl. No.: 901,599

[22] Filed: Aug. 28, 1986

[51] Int. Cl.$^4$ ............................................. B65D 85/57
[52] U.S. Cl. .................................... 206/311; 206/309; 206/444; 206/445
[58] Field of Search ...................... 206/0.84, 3.09, 311, 206/312, 313, 387, 444, 462, 466, 307, 425, 445; 229/69, 72; 383/37, 38, 39

[56] References Cited

U.S. PATENT DOCUMENTS

| | | | |
|---|---|---|---|
| 877,060 | 1/1908 | Douglass | 229/72 |
| 2,333,798 | 11/1943 | Kner | 206/312 X |
| 4,365,708 | 12/1982 | Tyus | 206/387 X |
| 4,502,596 | 3/1985 | Saetre | 229/69 X |
| 4,620,630 | 11/1986 | Moss | 229/68 R X |

FOREIGN PATENT DOCUMENTS

| | | | |
|---|---|---|---|
| 605633 | 8/1960 | Italy | 206/311 |
| 822305 | 10/1959 | United Kingdom | 206/311 |
| 2135274 | 8/1984 | United Kingdom | 206/309 |

Primary Examiner—Stephen Marcus
Assistant Examiner—T. Graveline
Attorney, Agent, or Firm—M. K. Silverman

[57] ABSTRACT

Disclosed is a guard and carrying system for compact discs. The system includes a collapsible enclosure having a mouth portion, extensible side portions, a V-shaped vertex portion, and a secureable fold-over cover. Also included is an accordion-like integral series of V-shaped storage elements. These elements include an elongated, substantially rigid, yet foldable substrate. They further include an integral sleeve having a longitudinal axis and enveloping the substrate, trapping air in a planar geometry, and several outer sleeve segments disc-proportioned and disposed about the integral sleeve holding air between these segments and the integral sleeve. A plurality of linear heat seals are disposed transversely to the longitudinal axis of the integral sleeve. The heat seals bond the outer segments to the integral sleeve to define a pattern of pockets adapted for the holding of discs and disc-related documentation. The linear heat seals also act to define a plurality of planar air cushions between the integral sleeve and substrate, thereby creating a planar air cushion that will act to protect the discs from external pressures and impacts.

24 Claims, 6 Drawing Sheets

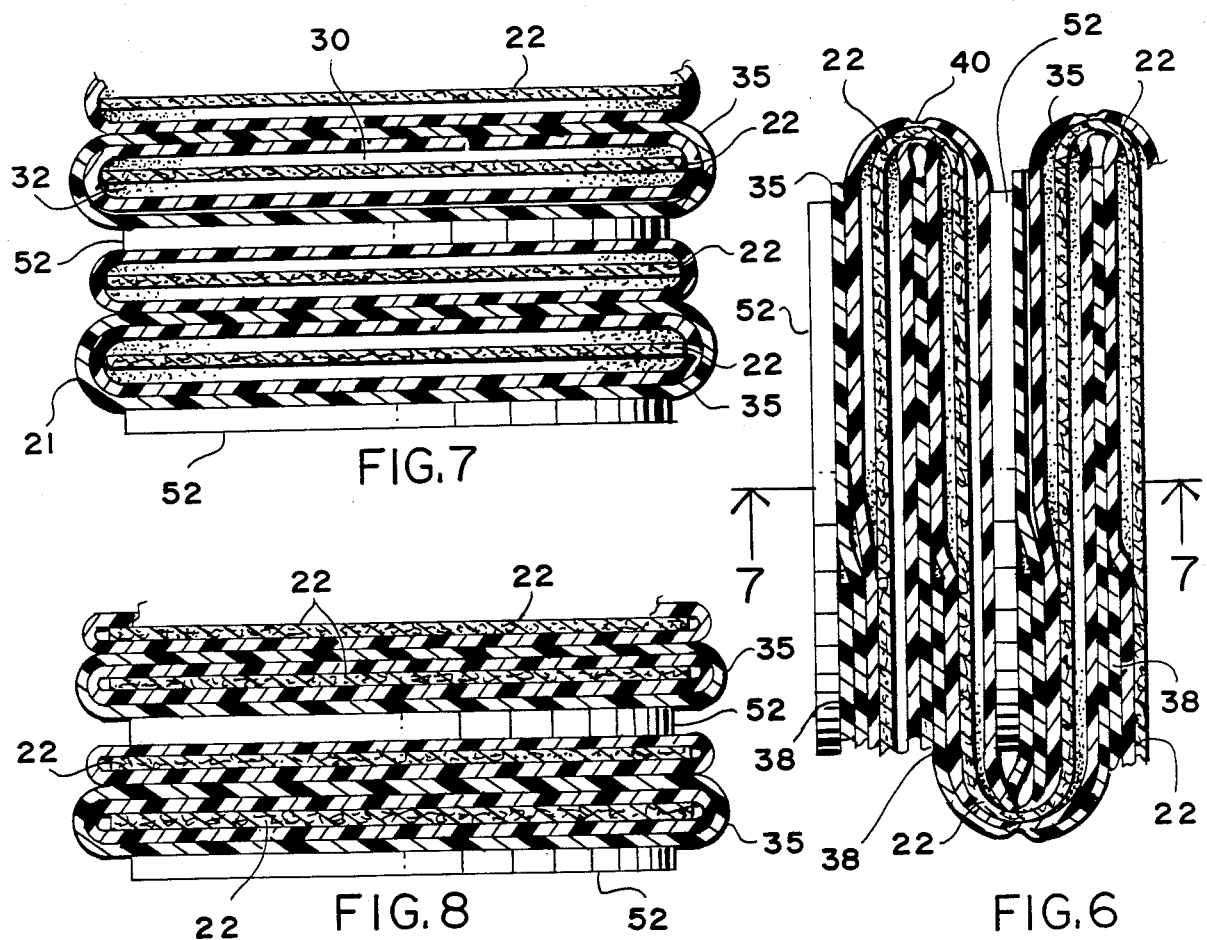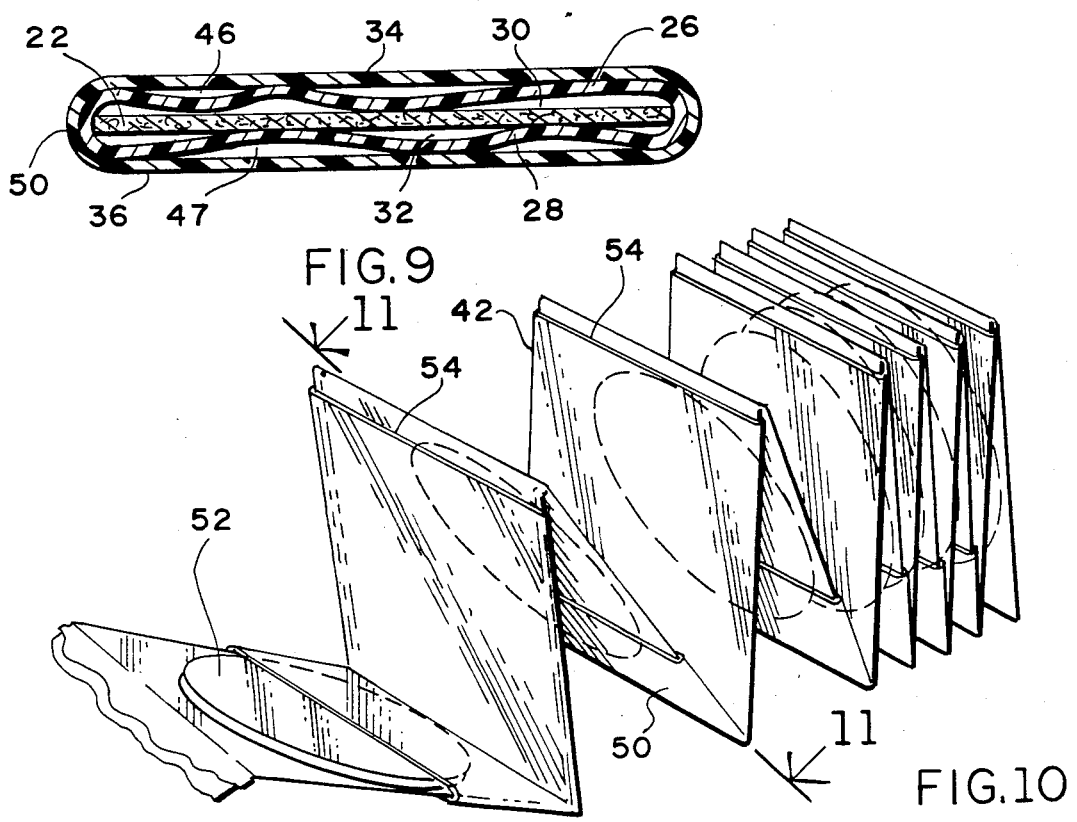

COMPACT DISC GUARD AND CARRYING SYSTEM

BACKGROUND OF THE INVENTION

1. Field of the Invention

The present invention relates to a container and, more particularly, to a disc guard and carrying case specially designed for use in association with Compact Discs.

2. Review of the Prior Art

Since 1877 when Edison first made recordings on a wax cylinder in his own voice, the means of preserving audio information has remained, until recently, essentially the same. While the technology has improved in both the recording medium and in the means of amplification, the principle of analog preservation of sound-as impressions in a mouldable material has remained relatively unchanged.

Within the last few years a new and qualitatively different method of sound recording has been introduced. Developed jointly by Sony and Philips and known as the Compact Disc or CD, it is a method of preserving, for ready and random access, large volumes of numerical data on a small reflective disc, where this data is formatted to represent the varying voltage levels associated with the instantaneous amplitude of a signal. The data is recorded as ultrafine, microscopic pits along a spiral path in a polymeric substrate, protected by an overlay of another thin polymeric layer. The pits represent a binary code that is later read via a special laser scanning system which shines into and through the transparent substrate. These pits are quite small (about one micrometer) and require an electron microscope to be photographed.

The resulting compact storage medium is so superior to conventional phonograph records or tapes that it promises to occupy a growing share of the audiophile market. Among its advantages over conventional records or tapes are: superior sound fidelity, cost-effectiveness in achieving quality, less vulnerability to scratching, dust, and fingerprints, no degradation from repeated playing, and last but not least, physical compactness in size.

It is particularly this last feature that has not as yet been fully appreciated or exploited. The cases now used to hold an individual CD are approximately equal in volume to that of a conventional audio cassette tape container, and are much larger than the CD itself. (The CD is approximately 120 mm in diameter and 1.2 mm in thickness.) This dichotomy has recently been emphasized by the advent of portable players that are only the size of three or four CD cases.

While various approaches have been proposed for solving this problem, none seem to be well adapted to the new and, in many ways unique, medium. Nor do they solve the problem of carrying a plurality of discs in a simple, easily accessable manner. It is to this latter problem of packaging that the current invention is addressed.

To put the problem in perspective, there were proposals for the storage of phonograph records that go back to the 1930's.

For example, U.S. Pat. No. 2,261,806 to Hills represents a "Carrier Case and Rack for Phonograph Records" reflective of the state of the art as of the late 1930's. Hills' case is essentially a plurality of pockets enclosed within a briefcase, with the pockets linked so that they automatically fold-out when the case is opened. This type of system requires a stable surface on which to place the case; otherwise one may easily lose control over the enclosed records. Also, by linking the pockets, they are not individually movable and the record labels cannot be viewed on the front surface of the disc.

U.S. Pat. No. 2,777,574 to Brody discloses a holder for phonograph records designed as an alternative to the album cover and record jacket arrangement commonly used with phonograph records. Brody attempts to provide means for protecting a record sheath from scratching or frictional wear, said means incorporating therein an outer protective envelope made of plastic material to be placed over the record sheath. Brody also discloses a protective strip folded upon itself to form overlying plies between which the record is sandwiched. The inner surfaces of the plies are smooth or polished to avoid frictional contact with the grooved surface of the record. While this may be effective in protecting the surface of the individual record, it is not adaptable to the requirement of ready and rapid access to a single disc, nor to the special problems in handling and carrying a plurality of said discs.

U.S. Pat. No. 3,942,639 to Cournoyer et al discloses a Disk Guard Device directed not to sound recordings but to the magnetic discs such as those used in the information processing field. Here again there are significant differences in structure in comparison to record cases/holders resulting from differences in function of the respective goods. For example, Cournoyer et al's Disk Guard Device includes restraining ribs to hold the disc firmly within the disc pocket, specially placed hooks to permit a plurality of discs to be slidably hung in a file drawer, and bottom projections to permit the guard device to pivot or fanfold when stored in a cabinet drawer. These features are directed to the unique problems of magnetic discs—especially the high flexibility and vulnerability to warping of the disc—and would be unnecessary and cumbersome if used in the CD context.

U.S. Pat. No. 4,538,730 to Wu discloses a storage box for computer floppy disks including collapsible storage bags, linked at their edges for extensibility. Unlike the present invention, which provides air-cushioned, protected pockets for each CD, the thrust of Wu is one of sufficiently separating between the pockets not the protective environment within a specific pocket. And, being similar to the previously cited invention of Hills, the same previously cited limitations apply here.

Accordingly, the prior art does not address or solve the problem of concern to the Inventor herein.

There are also on the market currently, several unpatented products: a cardboard folding package, an unlinked system of pockets within a soft protective jacket, and an unlinked system of pockets within a hard plastic case. (Sony CK-CD 6)

The invention herein disclosed resolves all of the problems outlined above. In so doing it helps to exploit one of the greatest potentials of the Compact Disc—namely, its compactness. A number of discs may be simply and safely transported, accessed at random from information on their respective indicia, and returned to their individual locations with a minimum of effort and dexterity. This can be done while walking or traveling without the need to support the device on a stable surface.

The outer jacket of the device is flexible, yet sturdy, and the innr portion is composed of a unique system of air cushioned surfaces which, together with the outer jacket, protect the discs against scratching or mechanical shock, and give the system a firm, rugged feel. There are no metal or hard plastic parts which could cause scratching, and each CD is protected on both its front and rear surfaces—both of which are sensitive to damage. While each CD may be fully viewed and then easily accessed with one hand, lifting it by the edges out of half-high pockets, these pockets are not themselves the main containment or security for the disc. Rather, containment is provided for by the seperate system of foldable surfaces, which form individual compartments between these surfaces and inside the secure jacket, so that there is little chance of dumping any CD's by accident during access.

There is also provision for the related indicia to be used in conjunction with the disc to allow for easy searching, retrieval, and identification of discs and locations.

Finally, in its preferred form the device is attractive, simple and inexpensive to manufacture.

In what follows I will disclose the unique features of this invention and explain how it evolves from a novel and unexpected juxtaposition of movable and collapsable planes, having a single axis of pivot, though they unfold in mutually orthogonal axes. I will show how this allows the device to open and close in a controlled manner and permit the full viewing and access of an individual compartment, and the collapse into a fully flat, portable geometry. A number of other unique and nonobvious features will be disclosed, some of which are claimed herein and others of which may be claimed in related and subsequent applications.

SUMMARY OF THE INVENTION

The present invention relates to a guard and carrying system for compact discs. The system includes a collapsible enclosure having a mouth portion, extensible side portions, a V-shaped vertex portion, and a secureable fold-over cover. Also included is an accordion-like integral series of V-shaped storage elements. These elements are elongated, substantially rigid, yet foldable substrate. They further include an integral sleeve having a longitudinal axis and enveloping the substrate, trapping air in a planar geometry, and several outer sleeve segments disc-proportioned and disposed about the integral sleeve holding air between these segments and the integral sleeve. A plurality of linear heat seals are disposed transversely to the longitudinal axis of the integral sleeve. The heat seals bond the outer segments to the integral sleeve to define a pattern of pockets adapted for the holding of discs and disc-related documentation. The linear heat seals also act to define a plurality of planar air cushions between the integral sleeve and substrate, thereby creating a planar air cushion that will act to protect the discs from external pressures and impacts.

The invention may be practiced either with or without the above-referenced collapsible enclosure.

It is an object of the present invention to provide a carrying case and/or holder which can accommodate and protect a plurality of Compact Discs.

It is another object of the invention to provide a CD carrying case and/or holder which has specially-adapted pockets to create a protective environment for the Compact Discs.

It is a further object of the invention to provide a CD carrying case and/or holder which displays informative indicia about a particular CD within close proximity thereto.

It is a yet further object to provide a CD carrying case and/or holder which facilitates easy insertion, removal and reinsertion of the discs.

It is a still further object to provide a CD carrying case and/or holder which is inexpensive relative to the high cost of the Compact Discs themselves.

Further objects and advantages of the present invention will become apparent from the hereinafter set forth Detailed Description of the Invention, the Drawings and the appended Claims.

BRIEF DESCRIPTION OF THE FIGURES

FIG. 6 is a schematic cross-sectional partially compressed view showing trapped air between the substrate and the integral sleeve.

FIG. 7 is a cross-sectional view, taken along Line 7—7, of FIG. 6 showing air trapped within the accordion-like storage means prior to full compression.

FIG. 8 is a cross-sectional view taken along Line 7—7 of FIG. 6 showing the storage means more fully compressed.

FIG. 9 is a cross-sectional transverse view taken along Line 9—9 of FIG. 2 showing trapped air between and within the substrate, the integral sleeve, and the segmented sleeves.

FIG. 10 is an assembled view of the storage means.

DETAILED DESCRIPTION OF THE INVENTION

Figure 1:
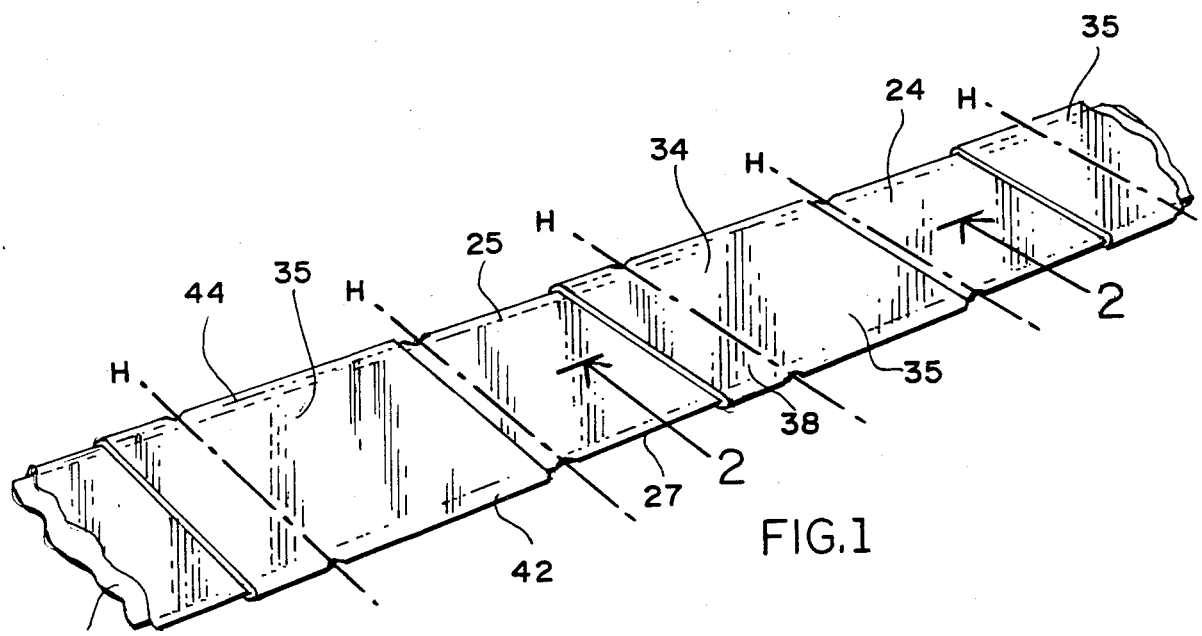
FIG. 1 is a perspective view of an integral sleeve element surrounded by a plurality of outer sleeve segments.

With reference to the perspective view of FIG. 1, there is shown an integral sleeve 24 and, thereupon, a plurality of outer sleeve segments 34. More particularly, integral sleeve 24 is defined by a top elongate element 26 and a bottom elongate element 28. These, in the preferred embodiment, are sealed along their top and bottom longitudinal edges 25 and 27. Accordingly, the effect thereof is the creation of an elongate substantially rectangular integral sleeve which, but for openings at the extreme left and right ends thereof (not shown)

define a fluid-tight integral enclosure, namely, said integral sleeve 24.

Proportionately formed and disposed within said integral sleeve 24 is a substrate 22 which, in the preferred embodiment, is a fibrous material such as a thick paper. The function of substrate 22 is to provide strength and stability to sleeve 24 which, typically, will be formed of a plastic such as polyethylene. Accordingly, said plastic, due to its thin dimension, softness, and flexibility, requires the substrate 22 in order to provide suitable support therefore.

Figure 2:
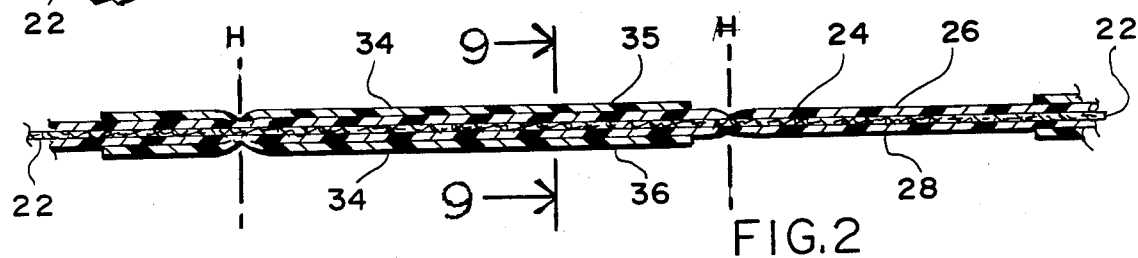
FIG. 2 is a longitudinal cross-sectional view of FIG. 1 taken along Line 2—2 of FIG. 1.
Figure 3:
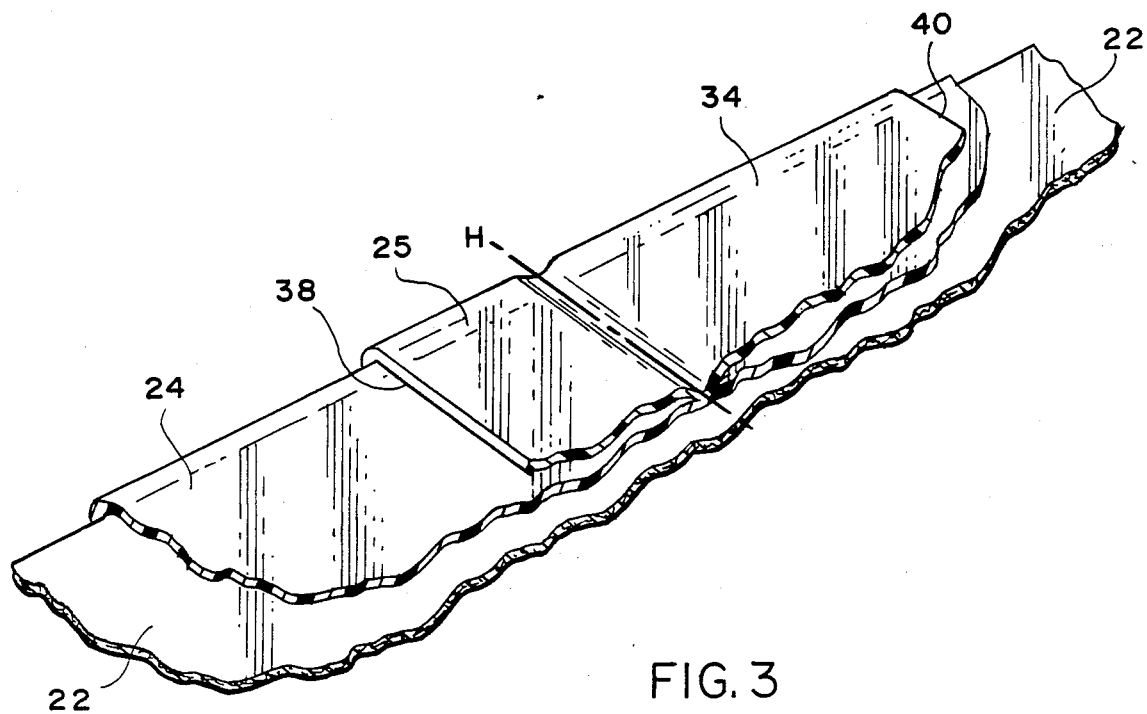
FIG. 3 is a fragmentary longitudinal perspective view of the view of FIG. 1 further showing a fiber substrate.
Figure 4:
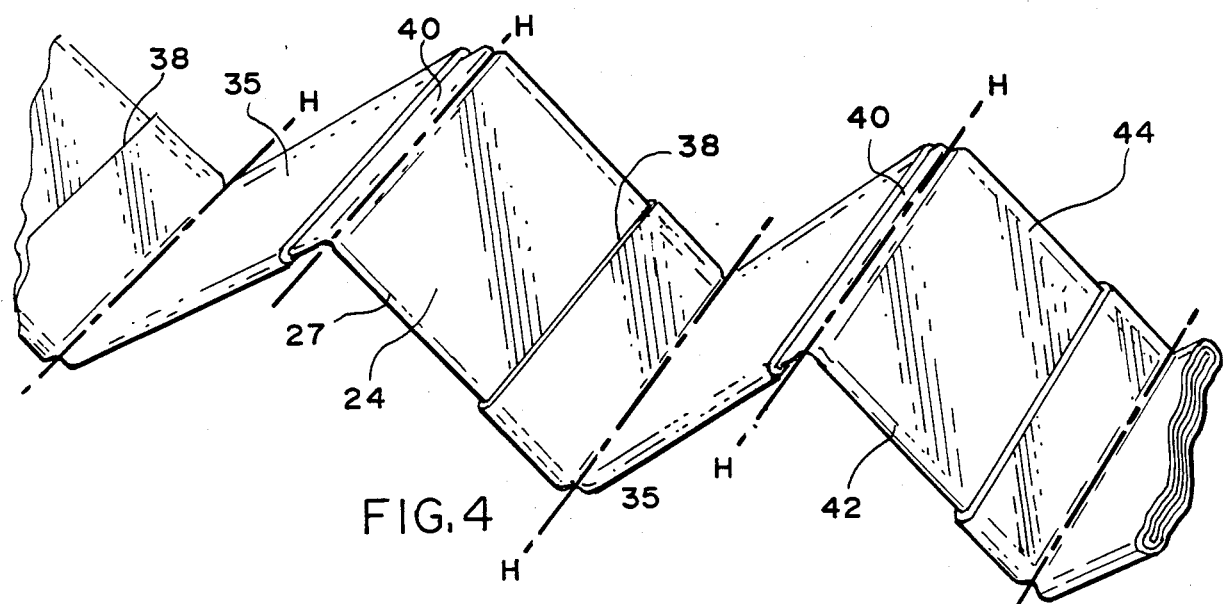
FIG. 4 is a perspective view of the inventive CD storage means.

Proportioned about the periphery of integral sleeve 24 is a plurality of outer sleeve segments 34 consisting of top sleeve elements 35 and bottom sleeve elements 36. These sleeve segments, as in the case of said integral sleeve 24, are, in the preferred embodiment, secured at their top and bottom edges to form a substantially loop-like element. As may be seen with reference to the fragmentary view of FIG. 3, sleeve segment 34 comprises a short (or small) pocket 38 and a long (or large) pocket 40 wherein the long pocket 40 is approximately two times the longitudinal length of short pocket 38. As may be further noted in FIG. 3, the lengths of said pockets 38 and 40, is defined by the position of heat seal H extending in a transverse direction relative to the longitudinal axis of integral sleeve 24. The use of heat seals H is more fully shown in the view of FIGS. 1, 2, and 4 in which it is seen that in addition to defining the respective longitudinal depths of short pocket 38 and long pocket 40 of sleeve segment 34, heat seals H operate to define the transverse dimensional limitation of compact disc 52 and related documentation 54 that can be held therein. In addition, the heat seals H define a plurality of planar air layers/cushions 30 and 32 which exists between substrate 22 and integral sleeve 24. (See FIGS. 2 and 9.) Said air layers 30 and 32 are essentially a static fluid system in that air can neither be added nor taken therefrom in view of the sealing of said layers at edges 25, 27, and transversely by heat seals H. However, in an alternative embodiment, small apertures (not shown) may be provided within integral sleeve 24 in order to permit layers 30 and 32 to "breathe", thereby providing an enhanced degree of flexibility to the instant storage means.

Figure 5:
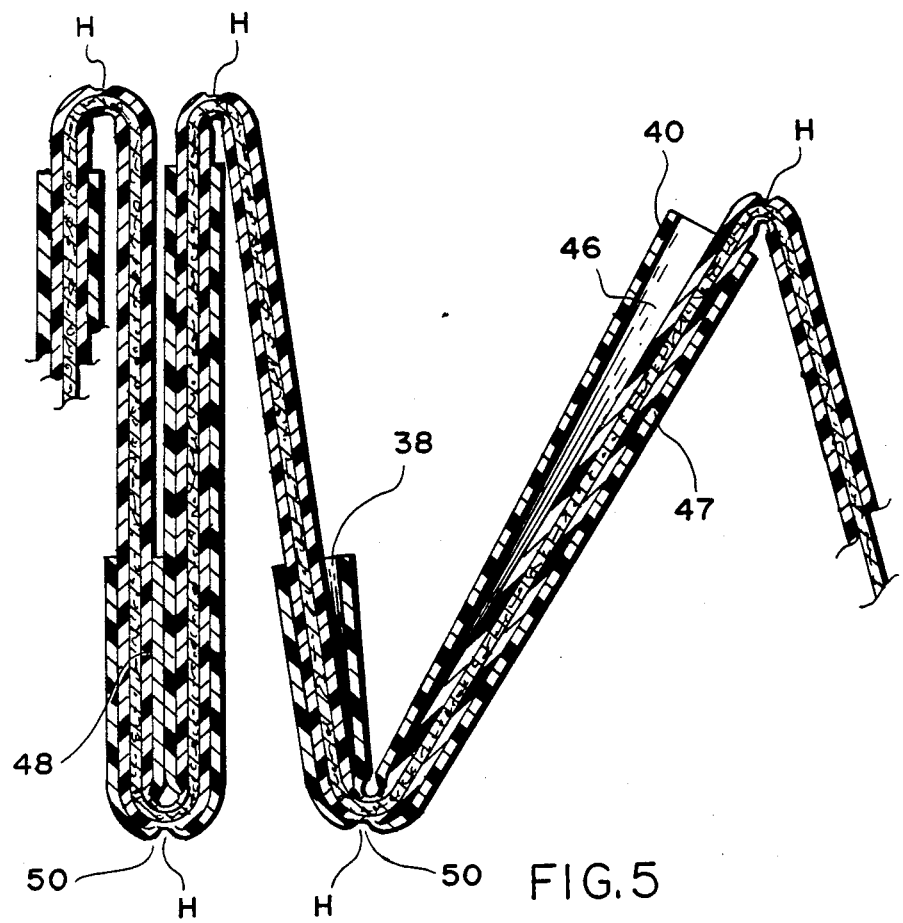
FIG. 5 is a side cross-sectional, partially collapsed schematic view of the storage means.

Between integral sleeve 24 and sleeve segments 34 is upper air layer 46 and lower air layer 47. These are dynamic air layers in that their fluid content will vary with the degree of pressure applied thereto and in that they are not sealed at the openings to short pocket 38 and long pocket 40 (See FIGS. 5 and 9).

With further regard to the heat seals H, it is to be noted that in addition to its compartment defining function, there is defined a hinge 50 which provides transverse stability to the inventive storage means during its contemplated usage.

It may be seen that a fundamental novelty of the present invention lies in its usage of a plurality of air layers in order to cushion and protect the compact discs which are stored within the particular geometry above-described and shown in FIGS. 1 through 5. The use of both static and dynamic air layers produces a desirable cushioning effect which, as above-noted, is of considerable utility in the storage and protection of compact discs. This feature is in addition to the discovered favorable properties of polyethylene, e.g., softness and flexibility, in the present application.

With regard to the sequential views of FIGS. 6, 7 and 8, it may be seen that the inventive V-shaped storage elements 21 may be compressed to a substantial degree while air layers 30 and 32 are preserved, thus protecting discs 52.

Figure 11:
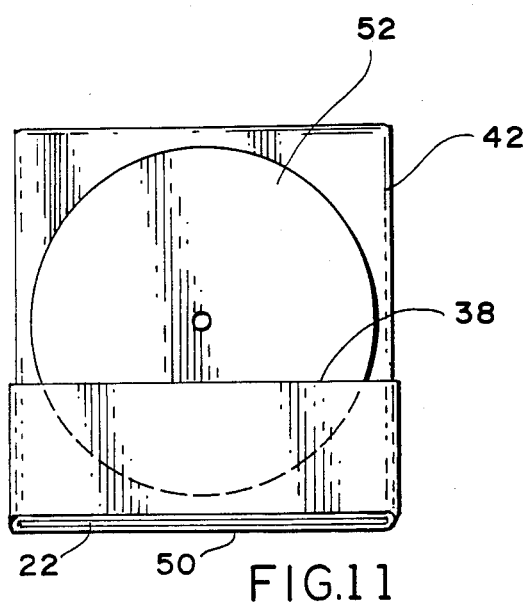
FIG. 11 is a view of one side of one segment of the storage means shown in FIG. 10.
Figure 12:
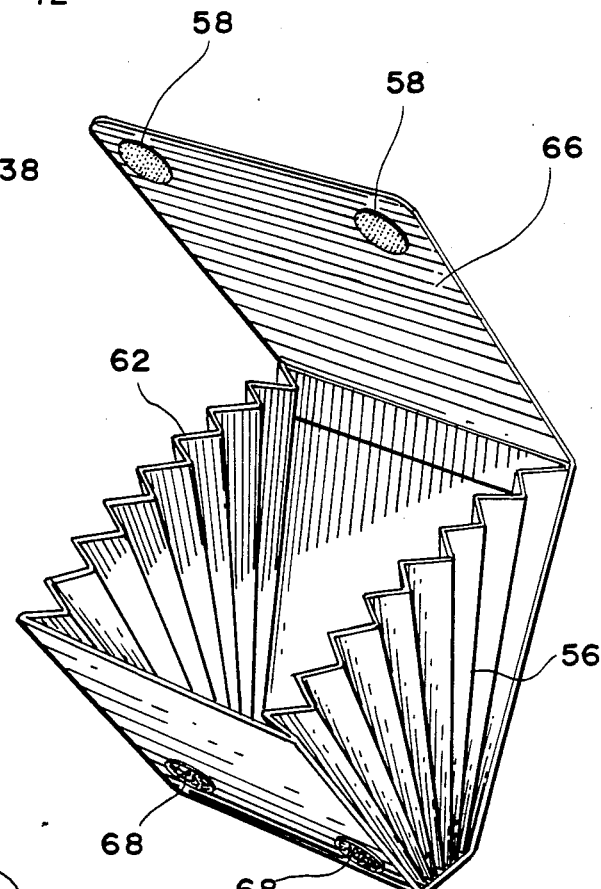
FIG. 12 is a perspective view of the accordion jacket showing the hinge-action bottom thereof.
Figure 13:
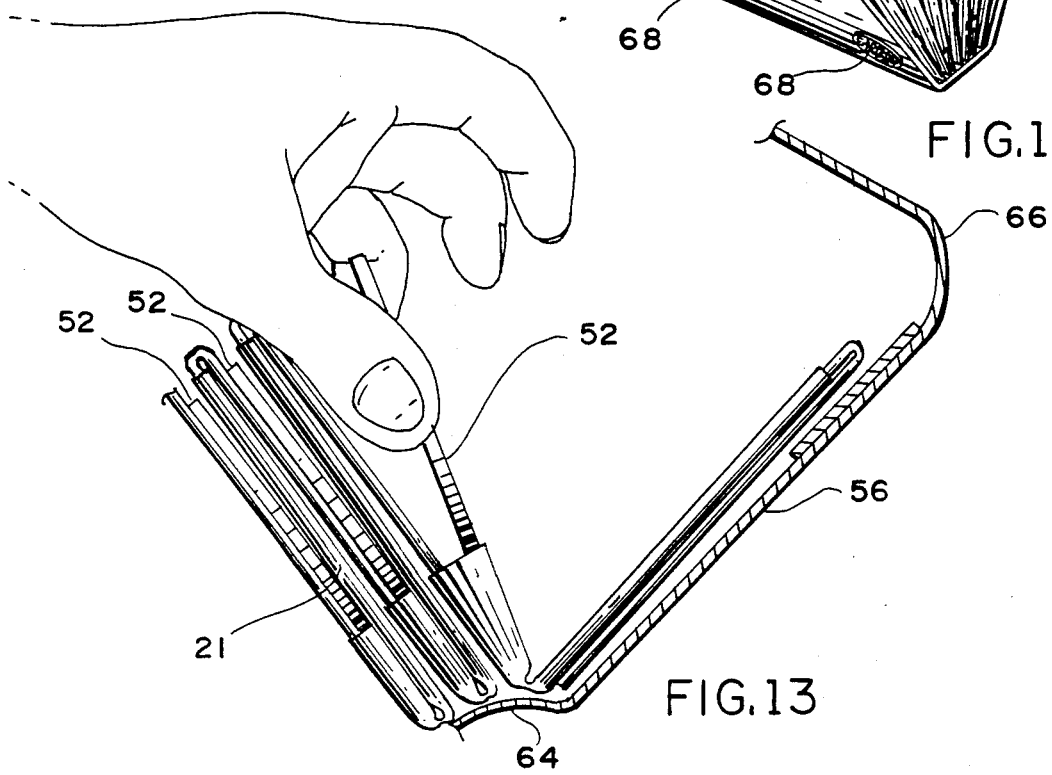
FIG. 13 is an operational view of the present invention.
Figure 14:
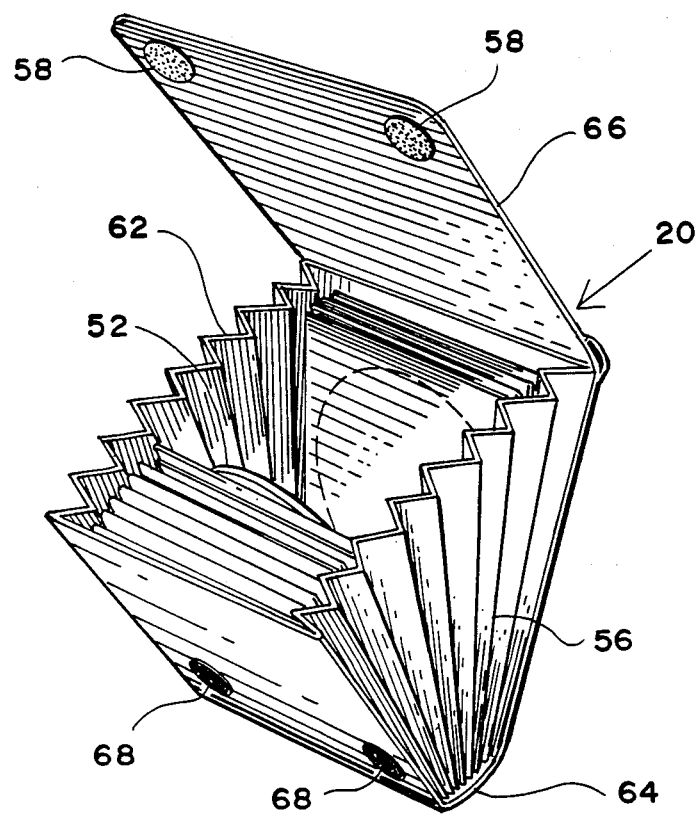
FIG. 14 is a further operational view showing the storage means in place within the collapsible enclosure.
Figure 15:
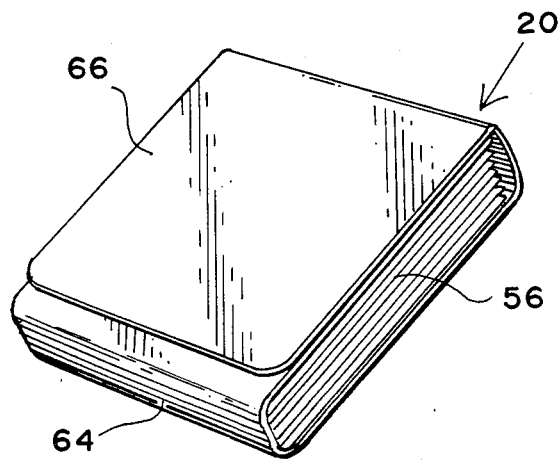
FIG. 15 illustrates the storage means closed and stored within the collapsible enclosure.
Figure 16:
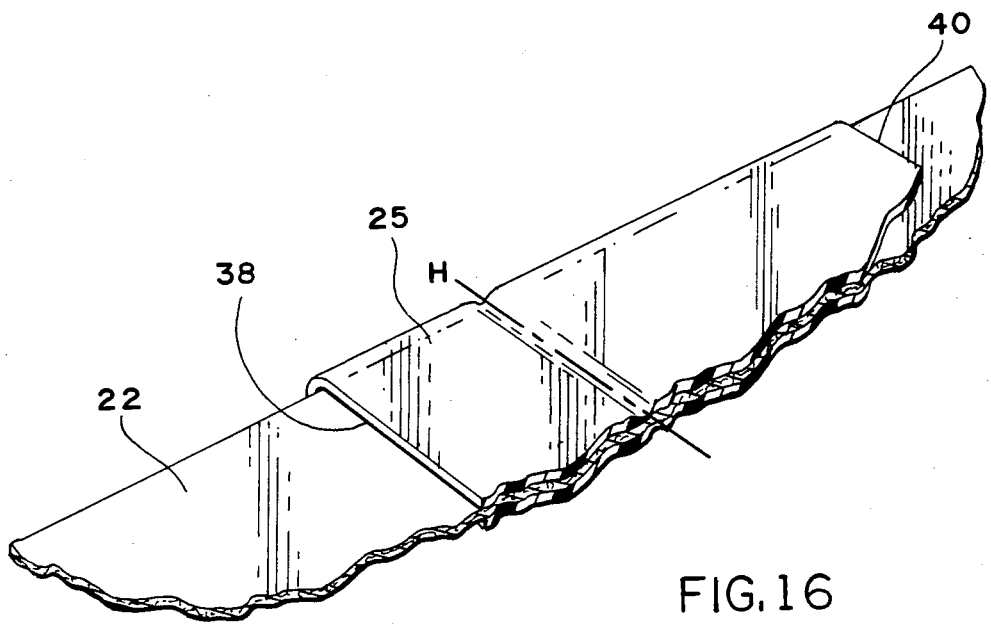
FIG. 16 is a partial fragmentary view of a second embodiment of the present invention.
Figure 17:
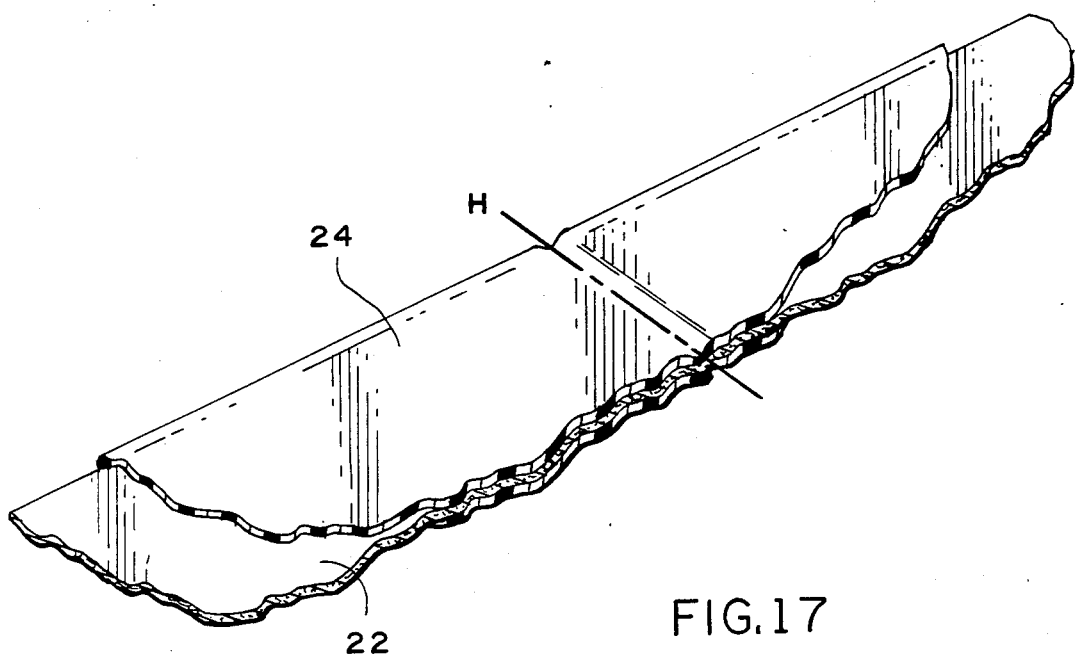
FIG. 17 is a partial fragmentary view of a third embodiment of the present invention.

In FIGS. 10 and 11, the inventive structure may be seen with discs 52 and documentation 54 placed in their respective short and long pockets 38 and 40. This entire assembly may, thereupon, be placed within an extensible accordion-type folder 56 provided with male 58 and female 68 press-fittable securing means such as VELCRO. The enclosure 56 is further provided with a mouth 62, a vertex hinge 64 and a cover panel 66. Accordion enclosure 56 is proportioned to accommodate the V-shaped storage elements 21 in the manner shown in FIGS. 13 and 14. It is noted that the V-shaped storage elements 21 will, when placed within enclosure 56, pivot about vertex 64 such that a user can easily advance the panels of the storage means in locating the disc or documentation of interest to him.

While there has been herein shown and described the preferred embodiment of the present invention, it is to be understood the invention may be embodied otherwise than is herein illustrated and described and that in said embodiments, certain changes in the detailed construction, and in the form and arrangement of parts may be made without departing from the underlying idea or principles of this invention within the scope of the appended claims.

Having thus described my invention, what I claim as new, useful and non-obvious and, accordingly, secure by Letters Patent of the United States is:

1. A portable guard and carrying system useful with compact discs, comprising:
   (a) a collapsible enclosure having a mouth portion, extensible side portions, a V-shaped vertex portion, and a fold-over cover;
   (b) an accordion-like integral series of V-shaped storage means, said storage means comprising a foldable integral sleeve having a longitudinal axis, said sleeve comprising means for trapping air therein within a planar volume, thereby stiffening and flattening the skin of said sleeve when said sleeve is subjected to uniform surface pressures; and
   (c) a plurality of linear folds disposed transversely to the longitudinal axis of said integral sleeve, said folds defining a plurality of surfaces capable of holding compact discs between said surfaces in which the transverse dimensions of said integral sleeve are proportioned to nest in the vertex portion of said collapsible enclosure,
   whereby a folding along said folds will cause said plurality of surfaces to fold upon each other and will cause said planar volume of trapped air to define a plurality of planar air cushions that will act to protect said discs from said external pressures and impacts.

2. The system as recited in claim 1 in which said series of V-shaped storage means further comprises:
   an elongate, substantially rigid foldable substrate disposed within said integral sleeve and defining substantially the same planar volume as said planar air cushions.

3. The system as recited in claim 2 in which said integral sleeve is formed by the bonding of a top rectangular element to a bottom rectangular element.

4. The system as recited in claim 2 in which said integral sleeve further comprises pocket means for stabilizing said disc and stabilizing disc related documentation relative to the interior of said collapsible enclosure.

5. The system as recited in claim 4 in which the substrate comprises a foldable, fibrous material and said pocket means comprise a flexible polymeric material.

6. The system as recited in claim 1 in which the integral sleeve further comprises pocket means for stabilizing said disc and stabilizing disc-related documentation relative to the interior of said collapsible enclosure.

7. The system as recited in claims 4 or 6 in which said pocket means comprises a plurality of outer sleeve segments, said segments disc-proportioned and disposed about said integral sleeve thereby holding air between said segments and said integral sleeve.

8. The system as recited in claim 7 in which said linear folds comprise heat seals.

9. The system as recited in claim 8 in which said linear heat seals define flexible hinge means.

10. The system as recited in claim 4 or 6 in which said pattern of surfaces define first and second pockets, said first pocket proportioned to hold compact discs, and second pockets proportioned to hold disc-related documentation relating to that disc disposed in said first pocket and disposed longitudinally oppositely thereto.

11. The system as recited in claim 10 in which the ratio of the longitudinal extent of said first pocket to the longitudinal extent of said second pocket is about 1 to 2.

12. The system as recited in claim 4 or 6 in which said integral sleeve is provided with selectively disposed apertures to thereby provide control over the pressure and vacuum characteristic of the air within said planar air cushions.

13. A portable guard and carrying system useful with compact discs, comprising:
   (a) an accordion-like integral series of V-shaped storage means, said storage means comprising a foldable integral sleeve having a longitudinal axis, said sleeve comprising means for trapping air therein within a planar volume, thereby stiffening and flattening the skin of said sleeve when said sleeve is subjected to uniform surface pressures; and
   (b) a plurality of linear folds defining a plurality of surfaces capable of holding of compact discs,
whereby a folding along said folds will cause said plurality of surfaces to fold upon each other and will cause said planar volume of trapped air to define a plurality of planar air cushions that will act to protect said discs from said external pressures and impacts.

14. The system as recited in claim 13 in which said series of V-shaped storage means further comprises:
   an elongate, substantially rigid foldable substrate disposed within said integral sleeve and defining substantially the same planar volume as said planar air cushions.

15. The system as recited in claim 14 in which the substrate comprises a foldable, fibrous material and said pocket means comprise a flexible polymeric material.

16. The system as recited in claim 14 in which said integral sleeve is formed by the bonding of a top rectangular element to a bottom rectangular element.

17. The system as recited in claim 14 in which said integral sleeve further comprises pocket means for stabilizing said disc and for stabilizing disc related documentation.

18. The system as recited in claim 13 in which the integral sleeve further comprises pocket means for stabilizing said disc and for stabilizing disc-related documentation relative to the interior of said collapsible enclosure.

19. The system as recited in claim 17 or 18 in which said pocket means comprises a plurality of outer sleeve segments, said segments disc-proportioned and disposed about said integral sleeve thereby holding air between said segments and said integral sleeve.

20. The system as recited in claim 19 in which said linear folds comprise heat seals.

21. The system as recited in claim 20 in which said linear heat seals define flexible hinge means.

22. The system as recited in claim 17 or 18 in which said pattern of surfaces define first and second pockets, said first pocket proportioned to hold compact discs, and second pockets proportioned to hold disc-related documentation relating to that disc disposed in said first pocket and disposed longitudinally oppositely thereto.

23. The system as recited in claim 22 in which the ratio of the longitudinal extent of said first pocket to the longitudinal extent of said second pocket is about 1 to 2.

24. The system as recited in claim 17 or 18 in which said integral sleeve is provided with selectively disposed apertures to thereby provide control over the pressure and vacuum characteristic of the air within said planar air cushions.

* * * * *